July 5, 1955 B. ROBERTS 2,712,572

SUPERIMPOSED PLURAL RECORDING

Filed March 27, 1947 4 Sheets-Sheet 1

INVENTOR
Bruce Roberts
BY
Synnestvedt & Lechner
ATTORNEYS

July 5, 1955 B. ROBERTS 2,712,572

SUPERIMPOSED PLURAL RECORDING

Filed March 27, 1947 4 Sheets-Sheet 2

INVENTOR
Bruce Roberts

BY
Synnestvedt & Lechner
ATTORNEYS

INVENTOR
Bruce Roberts
BY
Synnestvedt & Lechner
ATTORNEYS

July 5, 1955

B. ROBERTS 2,712,572

SUPERIMPOSED PLURAL RECORDING

Filed March 27, 1947

4 Sheets-Sheet 4

INVENTOR
Bruce Roberts
BY
Synnestvedt & Lechner
ATTORNEYS

United States Patent Office 2,712,572
Patented July 5, 1955

2,712,572

SUPERIMPOSED PLURAL RECORDING

Bruce Roberts, Philadelphia, Pa., assignor to The International Electronics Company, Philadelphia, Pa., a corporation of Pennsylvania Application March 27, 1947, Serial No. 737,695
8 Claims. (Cl. 179—100.2)

This invention relates to magnetic recording, and more particularly concerns a method and mechanism for recording and reproducing two separate and distinguishable channels of intelligence in the same part of a magnetic record.

According to the conventional method of producing magnetic recordings, an electric current corresponding to the signal to be recorded is passed through the windings of an electromagnet having a pair of pole pieces separated by a flux gap. This electromagnet or recording head is positioned so that the lines of magnetic force linking the poles will permeate a recording medium comprising particles of magnetizable material distributed at random, in the manner diagrammatically indicated at A in Figure 1.

When the recording head is energized by an audio frequency current, the duration and number of the lines of magnetic force permeating the record medium will correspond to the frequency and intensity of the current. Inasmuch as the record medium contains particles of magnetically retentive material, a group of magnetic particles in the record medium will assume and retain magnetic characteristics determined as to magnitude by the intensity of the current and as to angular orientation by the angle of the line connecting the pole pieces to an axis of the record medium. If, now, the recording medium be moved relative to the recording head and an audio frequency current be continuously passed through the coils of the electromagnet, a series of magnetized domains, each having a field corresponding in magnitude to the intensity of the current, will be formed in the medium, and will be separated by spaces proportional to the frequency of the current and the relative velocity of the recording medium and the recording head.

The conventional magnetic record track, therefore, comprises a series of what may be considered to be individual magnets having a definite size, spacing and angular orientation, as illustrated at B in Figure 1.

According to the conventional practice, such a record is reproduced by translating it relative to a conductor at the same speed at which it was recorded. As each magnet passes in influencing relationship to the conductor, it induces an electric current in the conductor, and the aggregate effect of the series of magnets is to induce an alternating current corresponding in magnitude and frequency to the magnitude and frequency of the original recording current.

While the magnitude and separation of the individual magnets or magnetized domains depend upon the intensity and frequency of the recording current, the angular orientation of the magnetic fields of the individual magnets or magnetized domains is independent of the characteristics of the recording current and is determined only by the direction of the lines of magnetic force, which direction, in turn, is determined by the position of the flux gap of the recording magnet relative to the recording medium. Since the lines linking the pole pieces extend across the flux gap, it will be seen that the direction of the lines is ordinarily substantially normal to the flux gap of the recording head.

While in the discussion just above it was stated that the signal may be reproduced by passing the record in influencing relationship to a conductor, it should be understood that the conventional practice is to employ the same electromagnet for both recording and reproducing. The recording cycle, therefore, conventionally consists of forming magnetized areas whose axes are oriented at right angles to the flux gap of the recording head, and of reproducing the signal by passing these magnetized areas in influencing relationship to the recording head, whose flux gap is at right angles to the axes of the magnetized particles, that is to say, in the same position relative to the record medium as it was during the recording operation.

Whatever may be the mechanism by which the record is produced and reproduced, the fact is that the signal may be reproduced only by a recording head mounted in substantially the same position relative to the record medium as it occupied when the signals were recorded.

I have found that by positioning a second recording head with its flux gap angularly offset from the flux gap of the first recording head, a second series of magnetized domains, whose axes are angularly offset from the series produced by the first recording head, may be established in the same area, as illustrated at C in Figure 1, and that this second series of magnetized domains will induce a current in a second reproducing head in the same position as was occupied by the second recording head. The presence of the second series of magnetized domains has no appreciable effect on the first reproducing head, and the presence of the first series of domains has no appreciable effect on the second reproducing head. It will be seen, therefore, that two distinct records may be formed in the same portion of a recording medium, and that either of the records may be reproduced independently of the other.

A principal object of the present invention, therefore, is to produce a plurality of magnetic records in the same or overlapping areas of the same record medium.

Another object of the invention is to record simultaneously a plurality of distinguishable channels in the same record track.

A further object of the invention is to increase the effective duration of a record which may be produced on a recording medium of given physical size.

Yet another object of the invention is to provide for successive recording of different portions of the same record in the same record track, employing the same recording head throughout the operation.

The invention also contemplates recording different portions of a record in the same record track in the same or opposite directions.

How the foregoing and other objects are attained will be more clearly understood upon reference to the following description and the drawings, in which.

Figure 1:
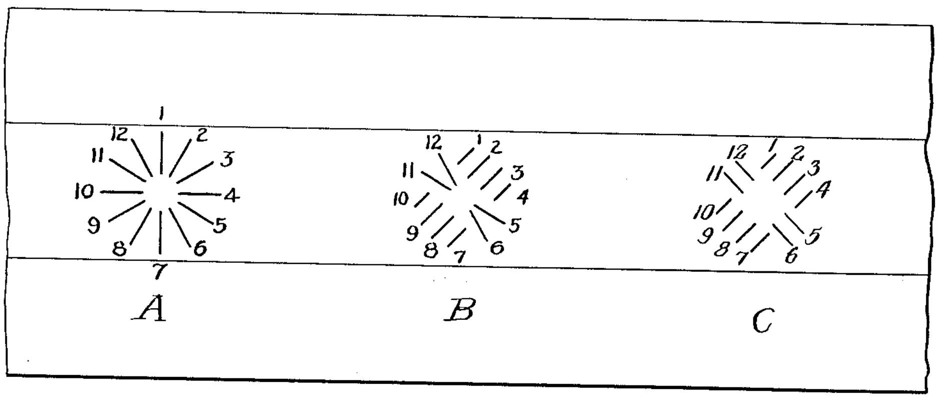
Figure 1 is a diagrammatic illustration of one explanation of the magnetic phenomena underlying the invention.

In Figure 1, at A, is a diagrammatic indication of the magnetic condition of an unrecorded magnetic record blank in which the radial lines designated by numbers from 1 to 12 represent the random angular orientation of 12 magnetic particles or groups of particles. If, now, a magnetic recording be made on the medium of Figure 1 by a recording head in juxtaposition to the record medium, with the gap between the pole pieces at an angle of 45° to the transverse axis of the record medium as indicated at 29 in Figure 2, magnetic particles or groups of particles are magnetized at right angles to the gap 29. The degree of magnetic reorientation and the spacing between the particles or groups of particles so magnetized will depend upon the intensity and frequency of the electric current in the recording head. In any case, the result will be a magnetic rearrangement of the particles in a sense normal to the gap between the pole pieces of the magnetic recording head, as indicated at B in Figure 1, in which the lines representing the magnetized particles 1, 2, 3, 4, 7, 8, 9 and 10 are shown in parallelism and lines 5, 6, 11 and 12 are shown substantially unaffected.

By making a second recording in the same area but with the position of the poles of the recording magnet shifted angularly 90° from their former position, a second series of magnetized domains may be established, this time with their axes substantially normal to the axis of domains previously magnetized. The result of this second magnetization is diagrammatically indicated at C in Figure 1, in which the lines 5, 6, 11 and 12 are shown to have been brought into parallelism.

It will be noted that 8 of the 12 particles or domains were magnetically reoriented by the first recording head and only 4 have been brought into parallelism by the second. I have indicated this disparity because I have found that the intensity of recording of the second record is somewhat lower than of the first record, which, I believe, may be due to the fact that certain of the particles are susceptible to magnetic reorientation by either of the recording heads, and therefore are reoriented by the first recording head which comes into influencing relationship with them. While the figure indicates that this ratio is two to one, it should be clearly understood that this does not represent a quantitative ratio of the intensity levels of the two recorded signals.

Depending upon the end results desired, the invention may be practiced in one of several ways. For example, by employing two recording heads, each fed by a separate signal channel, two recordings may be produced simultaneously in the same area, and by employing two reproducing heads, each connected to a corresponding signal channel, either or both of the simultaneously recorded records may be reproduced.

On the other hand, it may be desirable to successively record the first part of a record in the record track and then record the second part in the same record track, in which case the signal to be recorded will be fed into one of the recording heads for a portion of the recording operation and into the other recording head during the remainder of the operation, the record medium translating mechanism being arranged to effect relative movement of the record medium and the recording heads twice in the same path.

Alternatively, when only successive recording is desired, a single recording head may be employed for the entire recording, in which case the angular orientation of the recording head relative to the recording medium is shifted, preferably by an angle of substantially 90°, at the time when repeat scanning of the record medium is commenced.

Three different forms of apparatus by means of which the invention may be practiced are illustrated herein, two of which involve a pair of recording heads arranged with their gaps substantially normal to one another, and the third of which employs a single recording head which is shifted from one position of angular adjustment to another, the flux gap in the second position being angularly offset from its former position by substantially 90°.

Figure 2:
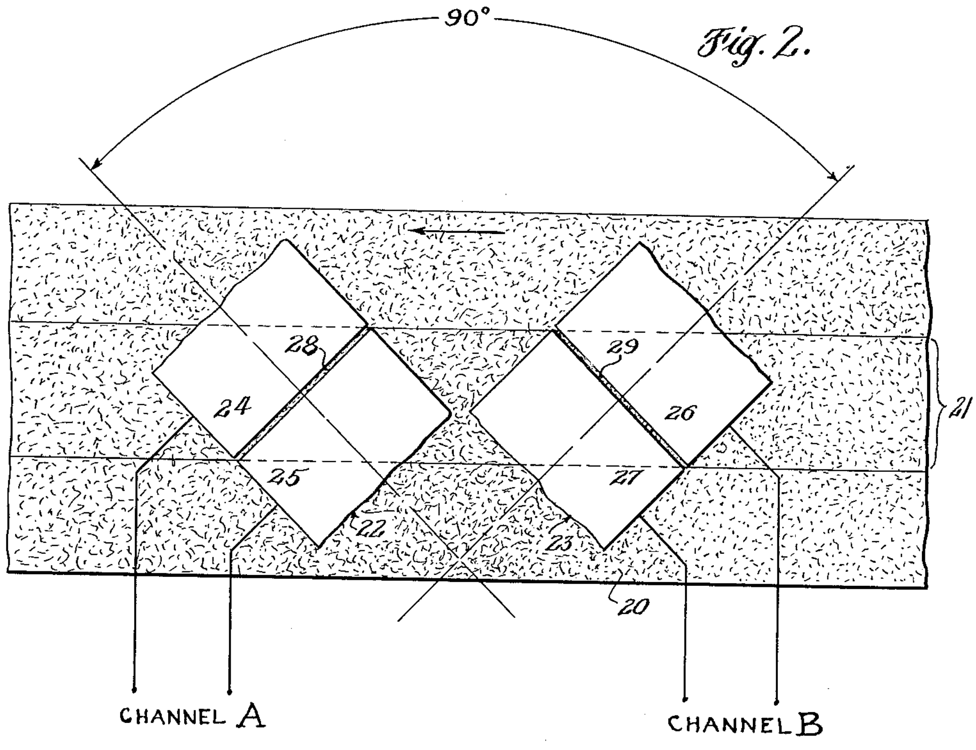
Figure 2 is an example of a form of the invention involving the use of two recording heads.

Figure 2 fragmentarily illustrates the application of the invention to a magnetic recording apparatus adapted to the production of simultaneous superimposed recordings, this figure being on a greatly enlarged scale. Typical pole pieces may be about 1/32″ thick, with a flux gap of the order of ten-thousandths of an inch.

Tape 20 is adapted to be translated in either direction relative to a pair of heads, portions of which appear at 22 and 23. The recording heads are located in juxtaposition to the tape in a manner to provide for scanning of a record track 21. Each head comprises a pair of pole pieces, head 22 including pole pieces 24 and 25, separated by a gap 28, and head 23 including pole pieces 26 and 27, separated by gap 29. The two heads are arranged with their gaps at 90° to one another and preferably in a manner to make equal angles with the longitudinal axis of the record track.

Head 22 is connected to a conventional signal channel diagrammatically indicated at A, which may include an amplifier, a microphone, a loudspeaker and means for switching the recording head from the input of the amplifier to the output of the amplifier to provide for both recording and reproduction. Head 23 is similarly connected to a second signal channel diagrammatically indicated at B.

According to the invention, for recording, the tape is translated in a given direction relative to the recording heads, and each of the heads is energized by a separate signal. As has been discussed above, the lines of force linking the pole pieces of recording head 22, for example, will result in magnetizing groups of the magnetic particles in tape 20 at right angles to gap 28. Similarly, the signal from channel B will be recorded in the form of groups of magnetic particles having their magnetic axes normal to gap 29 of head 23.

At the conclusion of the recording operation, the tape will be restored to the starting position and the associated equipment of the two channels will be adjusted for reproduction. When the tape is now translated relative to the heads in the same direction as during recording (see arrow), the motion of magnetic domains in the tape whose axes are normal to gap 28 will result in the production of induced currents in head 22, which will be reproduced in channel A. Since gap 29 of head 23 is normal to gap 28, magnetized domains having their axes normal to gap 28 will not affect head 23; but domains which have been magnetized with their axes normal to gap 29 will affect head 23 and result in currents induced in head 23 which will be reproduced by the amplifier and loudspeaker of channel B. Thus, two signals may be simultaneously recorded and simultaneously reproduced upon and from a single record medium.

Where it is desired to employ the invention to extend the duration of a recording, a single head may be employed to record two portions of the message or program by orienting the head in one position of adjustment relative to the record medium during a first period of the recording operation, and recording a second portion in the same record track but with the head in a different position of angular adjustment relative to the recording medium. For example, the magnetic tape recording and reproducing apparatus disclosed and claimed in my copending application, Serial No. 715,518, above mentioned, may be modified to incorporate the present invention, as illustrated in Figures 3, 4, 5, 6 and 7, appended hereto.

Figure 3:
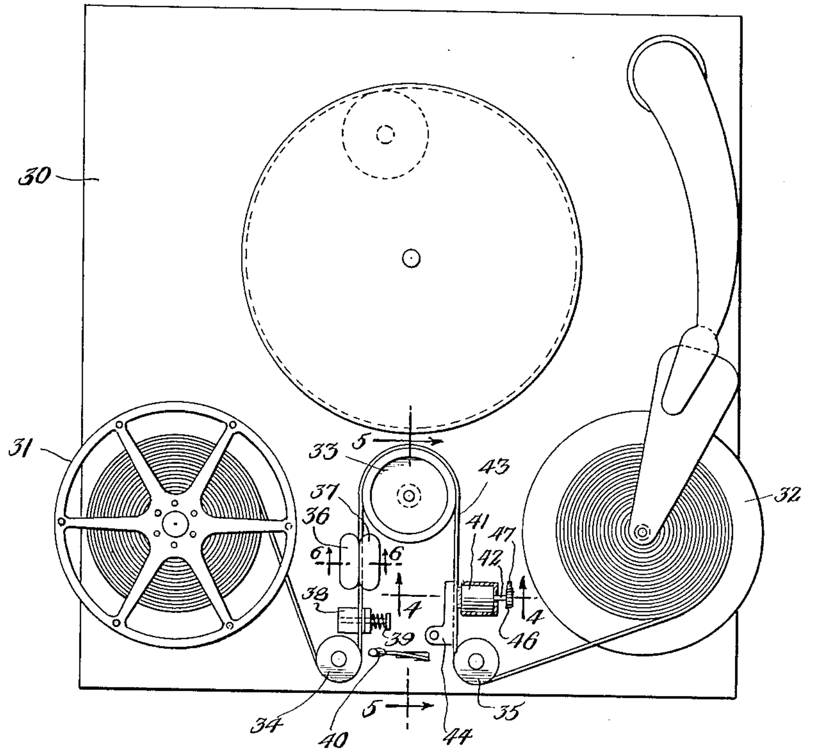
Figure 3 is a plan view of a magnetic tape recording and reproducing device, similar in its general form to the device disclosed in my copending application, Serial No. 715,518, filed December 11, 1946, now Patent No. 2,625,611, issued January 13, 1953, but incorporating a form of the present invention.

Figure 3 represents a plan view of the modified apparatus, in which may be seen a base 30 on which are mounted a tape storage reel 31, a temporary reel 32, a tape driving capstan 33, a pair of tape pulleys 34 and 35, a pair of switch housings 36 and 37, a tape perforator 38 having a plunger 39, a reversing lever 40, a recording head 41 mounted for rotation on a shaft 42 in a plane perpendicular to the recording surface of a tape 43, which is maintained in position against the recording head 41 by a tape latch 44. Details of the recording head mounting may be seen more clearly in Figure 4, in which 45 is a fixed cylindrical housing for head 41, 46 is a pinion mounted for rotation with shaft 42, and 47 is a rack engaging pinion 46 and penetrating an aperture 48 in deck 30. The upper and lower limits of movement of rack 47 are determined by a pin 49 attached to rack 47 near its lower extremity and adapted to abut against a stop 50 at the upper limit of travel of rack 47, and by a stop 51 against which the bottom end of rack 47 is adapted to abut at the lower limit of its vertical movement. The spacing between stops 50 and 51 is so proportioned in relationship to the diameter of pinion 46 as to permit a rotation of pinion 46, shaft 42, and recording head 41 of exactly 90°. This motion is effected by a lever 52 secured to shaft 53 by a screw 54.

Figure 5:
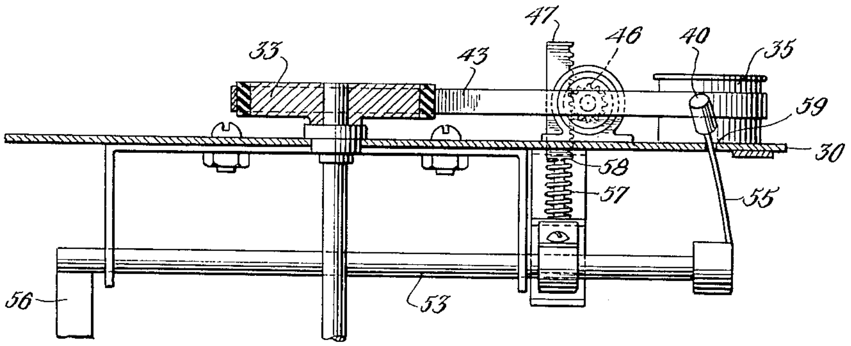
Figure 5 is also a detailed sectional view of a portion of Figure 3 taken along the line 5—5 of Figure 3.
Figure 6:
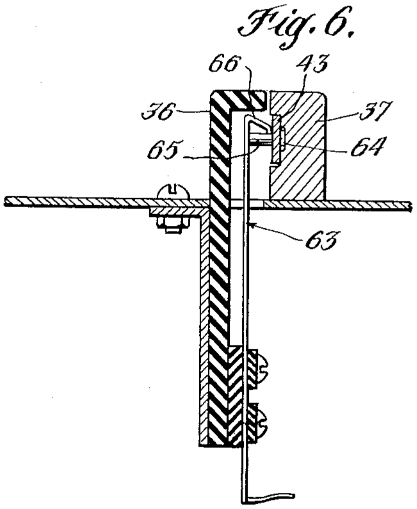
Figure 6 is a detailed sectional view taken along the line 6—6 of Figure 3.

As will appear in Figure 5, shaft 53 may be manually rotated by means of control handle 40 and spring lever 55. Shaft 53 is also connected by lever 56 to the mechanism for reversing the direction of rotation of reels 31 and 32 and tape capstan 33, as is fully described and explained in my copending application, Serial No. 715,518, referred to above.

Figure 7:
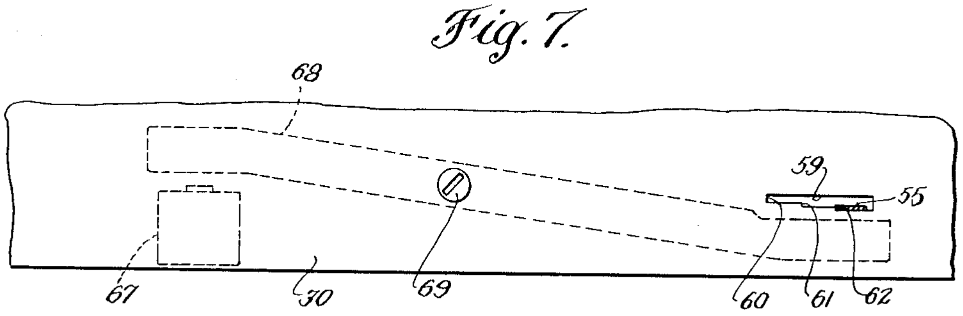
Figure 7 is a view partly in plan and partly in section of a portion of Figure 3, to an enlarged scale.

Spring 57, which is mounted on rack 46, reacts against stop member 50 at its lower end and against a shoulder 58 on rack 47 at its upper end, thus tending to hold rack 47 at the upper limit of its vertical movement and to maintain lever 52 and shaft 53 at the counter-clockwise limit of their movement. However, upon reference to Figure 7, it will be seen that lever 55 penetrates an aperture 59 in deck 30, which is provided with three notched steps, 60, 61 and 62. As illustrated in Figure 7, lever 55 may be rotated in a clockwise direction, and is so shaped as to be maintained in engagement with step 61 or 62 by virtue of its own tension, and will remain in that position until dislodged from engagement with the step. Step 60 corresponds to the reverse condition of the drive mechanism for the tape-translating components of the device, to the upper limit of movement of rack 47, and hence to the extreme clockwise position of pinion 46 and head 41 when viewed as in Figure 5. Step 61 corresponds to the neutral position of the drive mechanism and step 62 corresponds to the forward motion condition of the drive mechanism and to the extreme lower limit of movement of rack 47, and hence to the extreme counter-clockwise position of recording head 41 as viewed in Figure 5. It will therefore be apparent that if control handle 40 is moved from engagement with step 60, as illustrated in Figure 3, and shifted to step 62, as illustrated in Fig. 7, the forward motion drive train of the translating mechanism will be engaged and the recording head 41 will be in its extreme counter-clockwise position. With the apparatus in this condition, a recording may be made on the tape by starting the driving motor and feeding the signal to be recorded to head 41. If, now, after a portion or all of the tape has been scanned by head 41, handle 40 of lever 55 is pushed out of engagement with step 62 and permitted to snap into step 60, the drive mechanism will be reversed and the recording head 41 will be rotated 90° on its own axis to its extreme clockwise position. Under these conditions, the recording head will be presented with what, for practical purposes, is an unrecorded record medium.

At the conclusion of the recording operation, the recording may be reproduced by restoring the drive mechanism and recording head to their original positions and connecting the recording head to an amplifier and loudspeaker. The device will then be operated as before until the point on the tape is reached where the change of direction occurred during the recording operation, at which point handle 40 of lever 55 will be thrown to step 60, whereupon the second portion of the record will be reproduced.

In order to provide for automatic operation of the apparatus during the reproducing cycle, I have included a switch, generally indicated at 63 (see Figure 6) mounted in housings 36 and 37. This switch includes a grounded contact 64, set into housing 37, and a moving contact 65, normally separated from contact 64 by the presence of tape 43. Guide element 66 is provided to guide the edge of the tape around contact 65 during threading of the device. When a perforation made by perforator 38 passes through the switch, moving contact 65 comes into abutment with contact 64, energizing solenoid 67 (see Figure 7) which is mounted in juxtaposition to one end of a lever 68 pivoted at 69 to deck 30, and whose other end normally extends to a position parallel to aperture 59 in deck 30.

The operation of these elements is as follows: A recording is made according to the procedure outlined above. At the end of the first part of the recording, that is to say, at the moment when the mechanism is to be reversed, plunger 39 is operated, producing a perforation in tape 43. The recording is then completed as described above. The reproducing operation is also commenced in accordance with the procedure outlined above, but is completed automatically, inasmuch as when the point of reversal is reached on the tape, the perforation made by the plunger permits switch 63 to close, momentarily energizing solenoid 67. Lever 68 swings on pivot 69, forcing lever 55 out of engagement with step 62 and permitting it to slide under the impetus of spring 57 to position 60, whereupon the tape drive mechanism is reversed and the recording head 41 is rotated to a position corresponding to the position in which the second half of the recording was made. Notwithstanding the automatic control provided, reversing may also be effected manually as described above.

Figure 4:
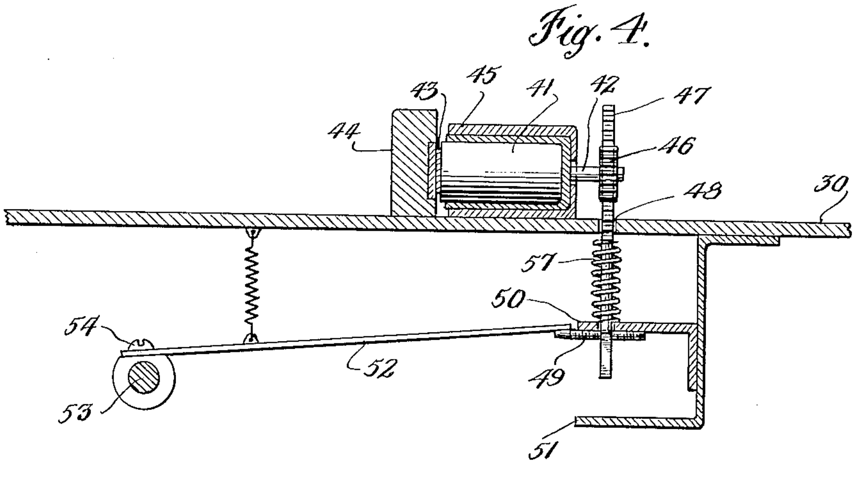
Figure 4 is a detailed sectional view of a portion of Figure 3 taken along the line 4—4 in Figure 3.
Figure 8:
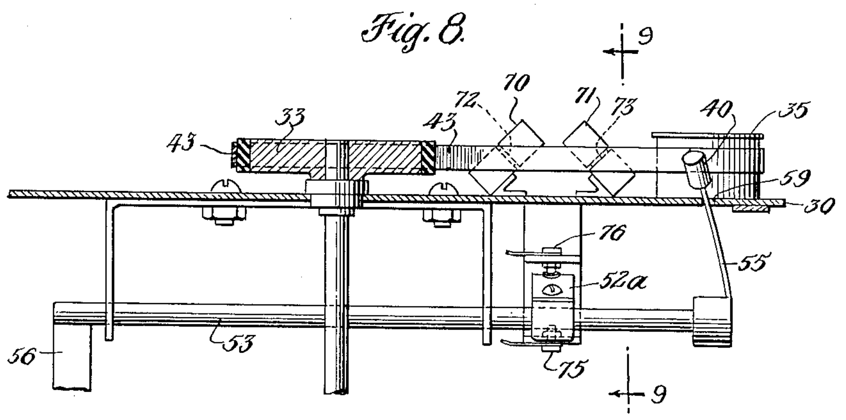
Figure 8 is an elevation, similar to Figure 5, of a portion of the mechanism of my copending application, Serial Number 715,518, but incorporating another modification of the present invention.
Figure 9:
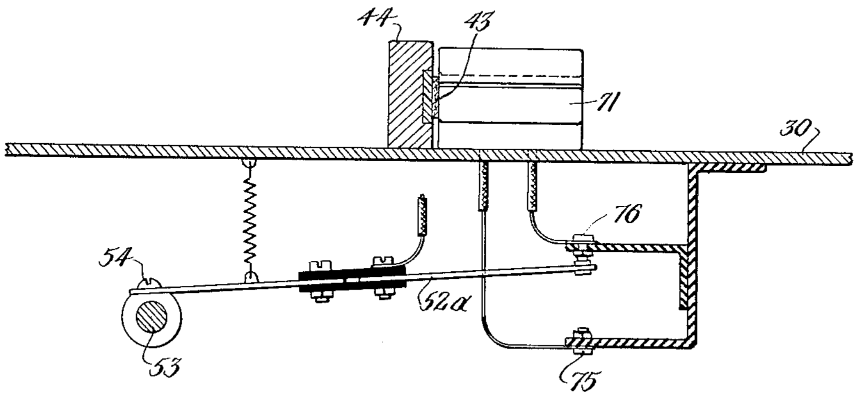
Figure 9 is a sectional view of the apparatus of Figure 8, taken along the line 9—9 of Figure 8.

Successive recording of two portions of the same message or program in the same record area can also be accomplished by means of two fixed heads rather than by a single shifting head. A modification of the tape machine of my copending application, Serial No. 715,518, above mentioned, incorporating two fixed heads is disclosed in Figures 8 and 9, in which the tape translating mechanism comprises the same tape capstan 33 and pulley 35, and the same control shaft 53, with control lever 55 and control handle 40 as illustrated in Figure 5. In this form of the invention, however, I have provided a pair of heads 70 and 71, positioned adjacent the path of tape 43 with their gaps substantially normal to each other, as indicated diagrammatically at 72 and 73. The windings of heads 70 and 71 are adapted to be alternatively connected to the external audio circuits by a switch comprising a pair of fixed contacts 75 and 76 and a moving contact secured to a lever 52*a*, which is secured to control shaft 53 in a manner and position analogous to lever 52 as shown in Figure 4. As will be seen, the switch will be operated at the same time and in the same manner as the head-shifting mechanism of Figures 4 and 5, and the operation of the apparatus will be the same except that, in the case of the apparatus disclosed in Figures 8 and 9, instead of shifting a single head to provide for magnetization of the tape in two different planes, two fixed heads with their gaps normal to each other are alternatively employed to provide for alternative magnetization in the two directions.

It will be apparent that a record made by a machine having two heads may be reproduced on a machine having one head, and vice versa. This is particularly true of records made by machines of the type illustrated respectively in Figures 3 to 7 on the one hand and 8 and 9 on the other; but it should also be understood that one channel at a time of recordings of the type illustrated in Figure 2 may be reproduced on either of the other two forms of machine.

I claim:

1. In the art of recording a magnetic record track on a record blank having a plane layer of magnetizable material consisting of separate magnetizable particles with their physical axes disposed and fixed at random and having uniform magnetic properties throughout the layer, the method which comprises producing a first record consisting of a series of discrete magnetized domains whose magnetic properties contrast with said uniform properties and which lie in a track, by generating a first magnetic field consisting of generally parallel magnetic lines of force of length less than the width of the field and generated in the plane of said layer, varying the intensity of said field in accordance with a signal while translating the record blank through said first field, producing a second record consisting of a series of discrete magnetized domains lying in the same track whose magnetic properties contrast both with said uniform properties and with the magnetic properties of said first domains, by generating a second magnetic field consisting of generally parallel lines of force of length less than the width of the field, and generated in said plane but normal to the lines of said first field, and varying the intensity of said field in accordance with a signal.

2. In a telegraphone, mechanism for feeding in a scanning path a plane record carrier carrying a layer of magnetizable material, a pair of recording heads positioned adjacent the path, each of said heads comprising a pair of magnetic pole pieces arranged to engage the same surface of a record fed by said mechanism, and the record engaging surfaces of each pair of pole pieces being separated by a magnetic flux gap, such gap in one head being offset from the gap in the other head by an angle of substantially 90° measured in the plane of said surfaces.

3. A telegraphone in accordance with claim 2, and further including a circuit for connecting one head to a first signal source and a circuit for connecting the other head to a second signal source.

4. A telegraphone in accordance with claim 2 and further including a circuit for alternatively connecting either of said heads to a single external signal source.

5. In a telegraphone, mechanism for feeding a plane magnetic record carrying a layer of magnetizable material in a scanning path, a first electromagnet having two pole pieces adjacent the path in position to scan a track on a record fed by said mechanism, the pole pieces being separated by a gap, disposed at an angle of 45° to the axis of the path of the record through the telegraphone, a second electromagnet having two pole pieces positioned to scan the same track and separated by a gap disposed at an angle of 90° from the gap of the first electromagnet, a signal channel and means for connecting the said channel alternatively to either of said electromagnets.

6. Magnetic recording-reproducing apparatus comprising mechanism for propelling a plane magnetic record carrying a layer of randomly oriented magnetizable particles in a scanning path, and magnetic pole pieces mounted for engagement with a single surface of a record propelled by said mechanism in each of two predetermined angularly distinct positions in both of which magnetic lines of force linking said pole pieces lie in said layer, in one of which said lines make a predetermined angle with the direction of said path, and in the other of which said lines are disposed at an angle to said direction differing by 90° from said predetermined angle.

7. Apparatus in accordance with claim 6 in which the magnetic pole pieces comprise a pair of such pieces having a flux gap therebetween and constituting a magnetic scanning head, and mechanism mounting said head for oscillatory movement about an axis normal to the flux gap and to said single surface of a record propelled by the propelling mechanism, the mounting mechanism providing for shifting of the position of the flux gap from a position in which the magnetic lines of force linking the pole pieces across said gap make a predetermined angle with the direction of the scanning path and a position in which said lines are disposed at an angle to said direction differing by 90° from said predetermined angle.

8. A construction according to claim 7 and further including a control for the mechanism for propelling the magnetic record providing for reversal of the direction of propelling the record, and means associated with said control for effecting oscillatory movement of the recording head between said two positions, whereby operation of the control effects reversal of the direction of propelling and angular shift of the pole pieces of the scanning head.

References Cited in the file of this patent

UNITED STATES PATENTS

| | | |
|---|---|---|
| 873,078 | Pedersen | Dec. 10, 1907 |
| 1,828,189 | Kiliani | Oct. 20, 1931 |
| 1,847,860 | Best | Mar. 1, 1932 |
| 2,167,188 | Schaarwachten | July 25, 1939 |
| 2,272,821 | Roys | Feb. 10, 1942 |
| 2,275,961 | Heller | Mar. 10, 1942 |
| 2,344,615 | James | Mar. 21, 1944 |
| 2,352,023 | Schuller | June 20, 1944 |
| 2,461,368 | Bradley | Feb. 8, 1949 |
| 2,469,750 | Sunstein | May 10, 1949 |
| 2,496,047 | Goddard | Jan. 31, 1950 |

FOREIGN PATENTS

| | | |
|---|---|---|
| 590,330 | Germany | Feb. 24, 1928 |
| 587,916 | Germany | Nov. 10, 1933 |
| 594,991 | Germany | Mar. 24, 1934 |
| 663,974 | Germany | Aug. 17, 1938 |

OTHER REFERENCES

Report C–59, April 2, 1946, page 4.

Magnetic Recording, S. S. Begun, 1949, pages 2 and 3.